(12) United States Patent
Fiebig et al.

(10) Patent No.: US 10,982,022 B2
(45) Date of Patent: Apr. 20, 2021

(54) METHOD OF FORMING MELT-BLOWN NON-WOVENS

(71) Applicant: BOREALIS AG, Vienna (AT)

(72) Inventors: Joachim Fiebig, St. Marien (AT); Henk Van Paridon, Averbode (BE); Jingbo Wang, Linz (AT); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/658,366

(22) Filed: Oct. 21, 2019

(65) Prior Publication Data

US 2020/0087428 A1 Mar. 19, 2020

Related U.S. Application Data

(62) Division of application No. 15/533,755, filed as application No. PCT/EP2015/079530 on Dec. 14, 2015, now abandoned.

(30) Foreign Application Priority Data

Dec. 15, 2014 (EP) ..................................... 14197888

(51) Int. Cl.
| | |
|---|---|
| C08F 8/06 | (2006.01) |
| C08F 8/32 | (2006.01) |
| C08F 110/06 | (2006.01) |
| C08J 3/22 | (2006.01) |
| C08K 5/1575 | (2006.01) |
| C08K 5/17 | (2006.01) |
| C08K 5/357 | (2006.01) |
| C08L 23/10 | (2006.01) |
| C08L 23/12 | (2006.01) |
| C08L 23/14 | (2006.01) |
| D01F 6/06 | (2006.01) |
| C08F 8/50 | (2006.01) |
| C08K 5/3435 | (2006.01) |
| D01D 5/088 | (2006.01) |
| D01D 5/08 | (2006.01) |
| D01D 5/098 | (2006.01) |
| D04H 3/007 | (2012.01) |
| C08K 5/14 | (2006.01) |
| D01D 1/02 | (2006.01) |
| B29K 23/00 | (2006.01) |
| B29L 31/00 | (2006.01) |

(52) U.S. Cl.
CPC .................. *C08F 8/50* (2013.01); *C08K 5/14* (2013.01); *C08K 5/3435* (2013.01); *D01D 1/02* (2013.01); *D01D 5/08* (2013.01); *D01D 5/088* (2013.01); *D01D 5/098* (2013.01); *D01D 5/0985* (2013.01); *D04H 3/007* (2013.01); *B29K 2023/10* (2013.01); *B29K 2023/12* (2013.01); *B29K 2023/14* (2013.01); *B29L 2031/726* (2013.01); *C08F 2810/10* (2013.01); *D10B 2321/022* (2013.01)

(58) Field of Classification Search
CPC ............ B29K 2023/10; B29K 2023/12; B29K 2023/14; B29L 2031/726; C08F 8/06; C08F 8/32; C08F 8/50; C08F 110/06; C08F 2810/10; C08J 3/22; C08K 5/14; C08K 5/1575; C08K 5/17; C08K 5/3435; C08K 5/357; C08L 23/10; C08L 23/12; C08L 23/14; D01D 5/08; D01D 5/088; D01D 5/098; D01D 5/0985; D01F 6/06; D04H 3/007; D10B 2321/022
USPC .... 264/103, 211.14, 211.21, 211.22, 211.23, 264/211.24, 331.17, 349, 555; 523/351; 524/99, 108, 110, 379, 381; 525/333.7, 525/333.8, 374, 375, 379, 387
See application file for complete search history.

(56) References Cited

U.S. PATENT DOCUMENTS

| | | |
|---|---|---|
| 2003/0216494 A1 | 11/2003 | Roth et al. |
| 2004/0265509 A1 | 12/2004 | Roth et al. |
| 2006/0128903 A1 | 6/2006 | Roth et al. |
| 2007/0200272 A1 | 8/2007 | Horst et al. |
| 2008/0045662 A1 | 2/2008 | Roth et al. |
| 2008/0199673 A1 | 8/2008 | Allgeuer et al. |
| 2009/0209158 A1 | 8/2009 | Richeson et al. |
| 2010/0267914 A1* | 10/2010 | Westwood ............. D04H 3/007 526/348 |
| 2016/0333509 A1* | 11/2016 | Novarino ............ D01D 5/0985 |

FOREIGN PATENT DOCUMENTS

| | | |
|---|---|---|
| DE | 102007049190 A1 | 4/2009 |
| KR | 20140058748 A | 5/2014 |
| WO | 9749737 A1 | 12/1997 |
| WO | 0190113 A1 | 11/2001 |
| WO | 0224767 A1 | 3/2002 |

(Continued)

OTHER PUBLICATIONS

Office Action for Korean Patent Application No. 10-2017-7016268 dated Aug. 22, 2017, 10 pgs.

(Continued)

*Primary Examiner* — Leo B Tentoni
(74) *Attorney, Agent, or Firm* — Lowenstein Sandler LLP

(57) ABSTRACT

Synergistic visbreaking composition of peroxide and a hydroxylamine ester for increasing the visbreaking efficiency for polypropylene polymers at melt extrusion temperatures below 250° C. and its use in visbreaking polypropylene. The present invention is furthermore related to the use of such visbroken polypropylene polymers for producing melt blown non-wovens with improved barrier properties.

5 Claims, 2 Drawing Sheets

(56) References Cited

FOREIGN PATENT DOCUMENTS

| WO | 2004081100 A1 | 9/2004 |
|---|---|---|
| WO | 2006027327 A1 | 3/2006 |
| WO | 2007096276 A1 | 8/2007 |
| WO | 2007126994 A1 | 11/2007 |
| WO | 2011092092 A2 | 8/2011 |
| WO | 2014069911 A1 | 5/2014 |

OTHER PUBLICATIONS

European Search Report for EP 14 19 7888 dated Mar. 2, 2015, 6 pgs.

Database WPI, Week 201437, XP002735935, May 8, 2014, 4 pgs., Thomson Scientific, London, GB (also WO 2014/069911).

International Search Report for PCT/EP2015/079530, dated Mar. 3, 2016, 12 pgs.

International Preliminary Report on Patentability for PCT/EP2015/079530, dated Apr. 11, 2016, 13 pgs.

Thesis from Alexandros Psarreas presented to the University of Waterloo in 2006 related to Nitroxide-Mediated Controlled Degradation of Polypropylene (p. 14).

Hensen, F., "Handbuch der Kunststoff-Extrusionstechnik I Grundlagen", 1989, vol. 1, pp. 3-7.

Hensen, F., "Handbuch der Kunststoff-Extrusionstechnik II Extrusionsanlagen", 1986, vol. 2, pp. 5-12.

Pure, Definition of Pure by Merriam-Webster, http://www.merriam-webster.com/dictionary/pure, retrieved Mar. 15, 2019.

Ciba Specialty Chemicals, Inc., Technical Information, "Ciba IRGATEC CR 76 Polymer Modifier for Polypropylene", May 2004, 2 pages.

Ciba Specialty Chemicals, Inc., Datasheet, A Giant Leap Forward in Meltblown Technology with Innovative Polymer Modification, 2004, Pub. No. R-0200.6, NAFTA Pub. No. PA-873, 2 pages.

\* cited by examiner

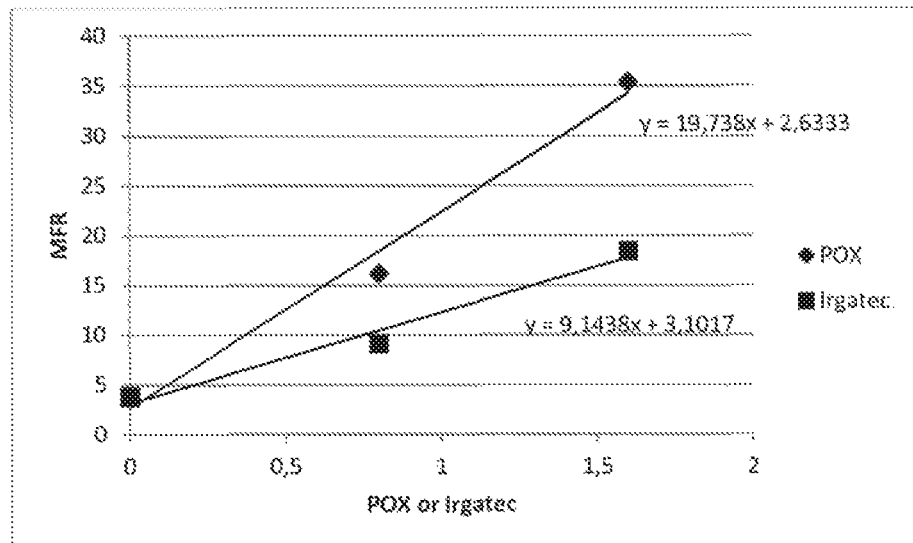
Figure 1:  MFR₂ values for the addition of only POX PP5%ig or only Irgatec® MB
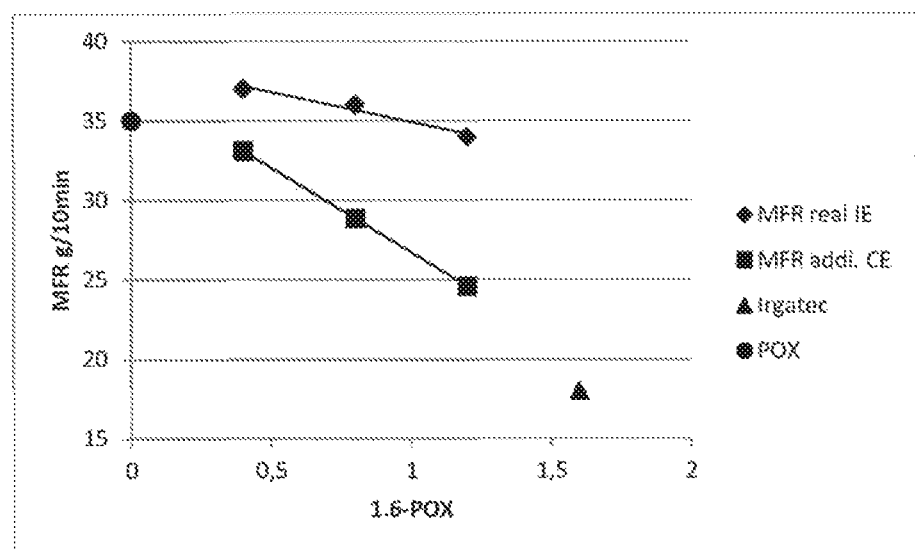
Figure 2:  the calculated MFR₂ values vs. the real MFR₂ values

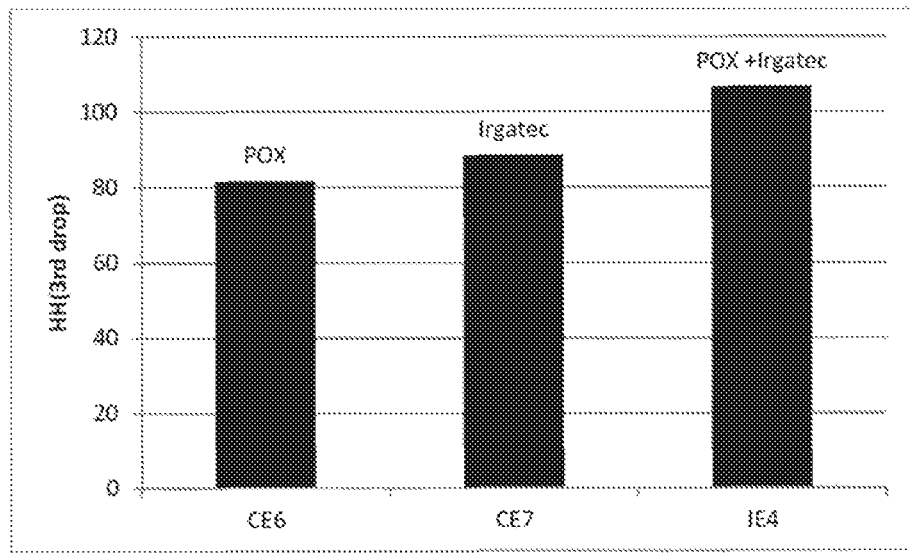
Figure 3: synergistic effect of using POX + Irgatec
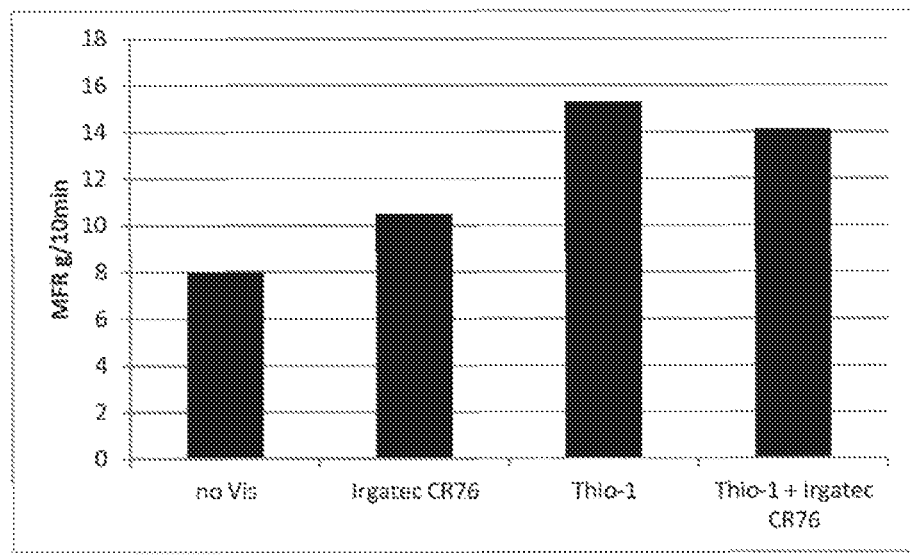
Figure 4: Comparative Example 8: No synergistic effect of using Irgatec + Thio-compound

METHOD OF FORMING MELT-BLOWN NON-WOVENS

CROSS-REFERENCE TO RELATED APPLICATION(S)

This application is a divisional of U.S. patent application Ser. No. 15/533,755, filed on Jun. 7, 2017, now abandoned, which is a national phase of International Application No. PCT/EP2015/079530, filed on Dec. 14, 2015, which claims the benefit of European Patent Application No. 14197888.2, filed on Dec. 15, 2014. The contents of these applications are hereby incorporated by reference in their entirety.

TECHNICAL FIELD

The present invention is related to a synergistic visbreaking composition of peroxide and a hydroxylamine ester for increasing the visbreaking efficiency for polypropylene polymers at melt extrusion temperatures below 250° C. and its use in visbreaking polypropylene. The present invention is furthermore related to the use of such visbroken polypropylene polymers for producing melt blown non-wovens with improved barrier properties.

BACKGROUND

The controlled preparation of polyolefin grades (polymer types having different molar masses, melt viscosities, densities, molar mass distributions, etc.) by customary compounding methods, for example by extrusion or injection moulding, is a routine process employed by polymer manufacturers and polymer processors/compounders.

The setting of the desired parameters, for example the melt viscosity, by means of this polymer process step is critically dependent on the controlled reactivity and mode of action of the additives employed.

The use of free-radical formers for modifying the melt viscosity (rheology) of polyolefins is a generally known method. Whether it results in a lowering of the molecular weight (degradation) or an increase in the molecular weight (cross linking) depends primarily on the chemical structure of the polyolefin.

The reaction of a polymer of the polypropylene type with a free-radical former during a polymer-processing process generally results in the degradation of the polymer, whereas polymers of the polyethylene type tend to crosslink.

The controlled degradation of polypropylene (PP) to give a product having a lower molecular weight and a narrower molecular weight distribution is a commercially important process for producing 'controlled rheology' polypropylene (CR-PP). While specific PP grades ("reactor grades") are obtainable by optimisation of the synthesis process or the catalyst systems (metallocene catalyst, Ziegler catalyst), standard PP grades are frequently modified in process technology by means of a processing step following the synthesis.

Known degradation processes proceed either thermally, in particular at temperatures above 280° C., or in the presence of free-radical generators. In process technology, the free-radical induced process is carried out in extruders or injection-moulding machines at temperatures above 180° C. Free-radical generators used are organic peroxides, which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (melt viscosities). The degradation of a PP to form a product having a lower molecular weight (higher melt flow rate (MFR)) and most importantly, a lower melt viscosity is generally referred to as a viscosity-breaking or visbreaking process.

CR-PP grades are mainly used for film, fibre applications and injection-moulding applications in which low melt viscosities are a prerequisite for economical processing. A wide range of melt viscosities or molecular weights is nowadays required in process technology.

A further parameter that influences the processing behaviour of the polymer, in addition to the molecular weight, is the molecular weight distribution (MWD). While polymer grades having broad MWDs display improved orientation behaviour of the polymer chains, at low pull-off speeds in a fibre spinning process, the reverse is the case for high putt off speeds and broad MWDs. For this reason, narrow MWDs are essential at high pull-off speeds in order to achieve improved continuity in the spinning process.

Apart from peroxides, other sources of free radicals are also known, e.g. C-radical generators based on cumyl systems, but these can be used only at temperatures above 280° C.

It is also known to use hydroxylamine esters as free radical source.

WO 97/49737 describes a process for reducing the molecular weight of polymers at temperatures above 280° C. using so-called NOR-HALS (HALS: Hindered Amino Light Stabilisers) compounds containing the group:

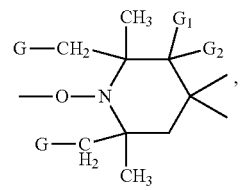

wherein G is hydrogen or methyl and G1 and G2 are each hydrogen, methyl or are together oxo. These known NOR-HALS compounds produce appreciable polymer degradation only at temperatures above 280° C.

WO 01/90113 discloses a process for reducing the molecular weight of polypropylene, propylene copolymers or polypropylene blends, wherein a hydroxylamine ester of the formula:

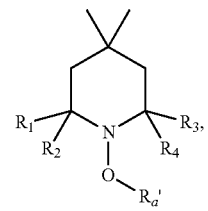

wherein among others Ra' is a monoacyl radical and R1-R4 are alkyl-substituents; is added to the polypropylene polymers to be degraded, and the mixture is heated to temperatures below 280° C.

According to WO 2007/126994 any hydroxylamine ester known in the art for reducing the molecular weight of, or viscosity breaking, polyolefin compounds, particularly propylene polymers can be used. It is referred to WO 01/90113, where such suitable hydroxylamine esters are generally described. Furthermore it is stated that a preferable hydroxylamine ester is Irgatec® CR76, sold commercially by Ciba Speciality Chemicals Corporation (now by BASF). The degraded polypropylene is used for non-woven filter elements.

From the thesis from Alexandros Psarreas presented to the University of Waterloo in 2006, related to Nitroxide-Mediated Controlled Degradation of Polypropylene (e.g. on page 14) it is known that Irgatec® CR76 shows equivalent visbreaking performance as a peroxide at a melt extrusion temperature of 250° C. Only at higher temperatures, like from 270° C. on, especially from 280° C. on, the performance of Irgatec® CR76 becomes better than the performance of the peroxide.

EP 1 282 630 describes the use of hydroxylamine esters for the controlled degradation of polypropylene, wherein the hydroxylamine ester has the formula

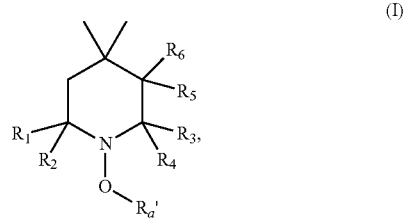

(I)

wherein
Ra' is a monoacyl or diacyl radical; R1-R4 are each C1-C6alkyl; and
R5 and R6 are each, independently of one another, hydrogen, C1-C6alkyl or C6-C10aryl; or
R5 and R6 are together oxygen. It is stated in EP 1 282 630 that in a specific embodiment, further sources of free radicals, e.g. a suitable bisazo compound, a peroxide or a hydroperoxide, in addition to the hydroxylamine esters (I) can be added to the polymers to be degraded. The use of two free radical sources is shown in the examples only for a sequential degradation of polypropylene (2 extrusion steps) using a hydroxylamine ester together with DTBPH (2,5-bis-tert-butylperoxy-2,5-dimethylhexane). EP 1 282 630 does not show any effect of the use of this combination.

EP 1 786 861 discloses that the use of hydroxylamine esters as described in WO 01/90113, especially a hydroxylamine ester of formula

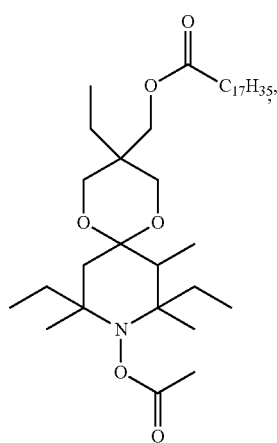

together with a sulphur compound, like Thio-Compound 1 ("Thio-1") of formula

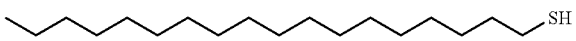 [SMILES: CCCCCCCCCCCCCCCCCCS]

for degrading polypropylene polymers at lower melt extrusion temperatures, like 250° C. As Comparative Examples in the experimental part of the present invention show, there is no synergistic effect of such a combination.

Although many alternatives are already known for the degradation of a PP to form a product having a lower molecular weight (higher melt flow rate (MFR)) and most importantly, a lower melt viscosity, there is a constant need to improve this visbreaking process, i.e. to find solutions, which need less degradation agents (i.e free-radical generators) for achieving the same visbreaking efficiency especially at melt extrusion temperatures below 250° C. and yield CR-PP grades, which can be converted into melt blown non-wovens with improved barrier properties.

Surprisingly the inventors found, that the above objects can be reached with the use of a combination of peroxide and a hydroxylamine ester.

SUMMARY OF THE INVENTION

Accordingly, the present invention relates in a first aspect to a synergistic visbreaking composition of peroxide and a hydroxylamine ester for increasing the visbreaking efficiency for polypropylene polymers at melt extrusion temperatures below 250° C., comprising peroxide (i) and hydroxylamine ester (ii) in a range of from 1 wt % (i):99 wt % (ii) to 99 wt % (i): 1 wt % (ii), whereby peroxide (i) and hydroxylamine ester (ii) are to be added as mixture or as individual components to the polypropylene to be visbroken.

Furthermore the present invention is related to the use of a such a composition comprising a peroxide (i) and a hydroxylamine ester (ii) for increasing the melt flow rate $MFR_2$ (230° C./2.16 kg) measured according to ISO 1133 of polypropylene polymers at melt extrusion temperatures below 250° C.

In another aspect the present invention is related to a method for increasing the visbreaking efficiency for polypropylene polymers at melt extrusion temperatures below 250° C. by adding the synergistic visbreaking composition of peroxide (i) and a hydroxylamine ester (ii) to the polypropylene polymer to be visbroken.

In a further aspect the present invention is related to the use of polypropylene polymers being visbroken with the synergistic visbreaking composition for producing melt blown non-wovens with improved barrier properties.

BRIEF DESCRIPTION OF THE DRAWINGS

FIG. 1 shows the $MFR_2$ values for the addition of only POX PP5% ig or only Irgatec® MB;
FIG. 2 shows the calculated $MFR_2$ values vs. the real $MFR_2$ values for 1.6 wt % of total visbreaking agent minus the wt % of POX (peroxide) used;
FIG. 3 shows the synergistic effect of using POX+Irgatec;
FIG. 4 shows comparative examples 8: no synergistic effect of using Irgatec+thio-compound.

DETAILED DESCRIPTION

In the following the invention is described in more detail.
The synergistic visbreaking composition according to the present invention contains peroxide (i) and a hydroxylamine ester (ii).

Ad Peroxide (i)
Typical peroxide visbreaking agents are 2,5-dimethyl-2, 5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumylperoxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC).

Preferred peroxides are 5-dimethyl-2,5-bis(tert.butyl-peroxy)hexane (DHBP) and tert.butyl-cumyl-peroxide (BCUP)

It is within the scope of the present invention to use either one specific peroxide or mixtures of different peroxides.

The peroxide may be part of a masterbatch.

In the sense of the present invention "masterbatch" means a concentrated premix of a propylene polymer with a free radical forming agent (peroxide).

The peroxide compound may preferably be contained in the peroxide masterbatch composition in a range of from 1 to 50 wt %, like from 5 to 40 wt %, based on the total composition of the masterbatch.

Ad Hydroxylamine Ester (ii)

Suitable hydroxylamine esters are selected from the group of hydroxylamine esters known in the state of the art, like for example those disclosed in WO 01/90113. One commercially available suitable hydroxylamine ester is for example Irgatec® CR76, sold commercially by BASF.

Preferred hydroxylamine esters (ii) are compounds of the formula $$\text{(I)}$$

wherein $R_a$ represents acyl;
One of $R_b$ and $R_c$ represents hydrogen and the other one represents a substituent; or
$R_b$ and $R_c$ both represent hydrogen or identical or different substituents; or
$R_b$ and $R_c$ together represent oxygen;
$R_1$-$R_4$ each represent $C_1$-$C_6$ alkyl; and
$R_5$ and $R_6$ each represent independently of one another hydrogen, $C_1$-$C_6$ alkyl or $C_6$-$C_{10}$ aryl;
or $R_5$ and $R_6$ together represent oxygen.

In the hydroxylamine ester (I) the term acyl with regard to the definition of $R_a$ preferably represents an acyl radical selected from the group consisting of —C(=O)—H, —C(=O)—$C_1$-$C_{19}$ alkyl, —C(=O)—$C_2$-$C_{19}$ alkenyl, —C(=O)—$C_2$-$C_4$ alkenyl-$C_4$-$C_{10}$ aryl, —C(=O)—$C_6$-$C_{10}$ aryl, —C(=O)—O—$C_1$-$C_6$ alkyl, —C(=O)—O—$C_6$-$C_{10}$ aryl, —C(=O)—NH—$C_1$-$C_6$ alkyl, —C(=O)—NH$C_6$-$C_{10}$ aryl and —C(=O)—N($C_1$-$C_6$ alkyl)$_2$;
$C_1$-$C_{19}$ alkyl in the acyl group $R_a$ is, for example, $C_1$-$C_6$ alkyl, e.g. methyl, ethyl, n-propyl or isopropyl or n-, sec- or tert-butyl or straight-chain or branched pentyl or hexyl, or $C_7$-$C_{19}$ alkyl, e.g. straight-chain or branched heptyl, octyl, isooctyl, nonyl, tert-nonyl, decyl or undecyl, or straight-chain $C_{11}$-$C_{19}$ alkyl, which together with the —(C=O)— radical forms $C_{14}$-$C_{20}$ alkanoyl having an even number of C-atoms, e.g. lauroyl ($C_{12}$), myristoyl ($C_{14}$), palmitoyl ($C_{16}$) or stearoyl ($C_{18}$).

$C_6$-$C_{10}$ aryl is, for example, carbocyclic monoaryl or diaryl, preferably monoaryl, e.g. phenyl, which may be monosubstituted or disubstituted by suitable substituents, e.g. $C_1$-$C_4$ alkyl, e.g. methyl, ethyl or tert-butyl, $C_1$-$C_4$ alkoxy, e.g. methoxy or ethoxy, or halogen, e.g. chlorine. In the case of disubstitution, the 2- and 6-positions are preferred.

The above-mentioned acyl radical Ra may be substituted on the free valences by suitable substituents, e.g. fluorine or chlorine, and is preferably formyl, acetyl, trifluoroacetyl, pivaloyl, acryloyl, methacryloyl, oleoyl, cinnamoyl, benzoyl, 2,6-xyloyl, tert-butoxycarbonyl, ethylcarbmoyl or phenylcarbamoyl.

$C_1$-$C_6$ alkyl as $R_1$-$R_4$ is preferably $C_1$-$C_4$ alkyl, in particular $C_1$-$C_2$ alkyl, e.g. methyl or ethyl.

In preferred embodiments, $R_1$-$R_4$ are methyl or ethyl. Alternatively, from one to three substituents $R_1$-$R_4$ are ethyl. The remaining substituents are then methyl.

$R_5$ and $R_6$ are preferably hydrogen. $C_1$-$C_6$ alkyl or $C_6$-$C_{10}$ aryl as $R_5$ and $R_6$ are preferably methyl or phenyl.

The hydroxylamine esters (I) are known or can be prepared by known methods, e.g. by acylation of the corresponding >N—OH compound in a customary esterification reaction with an acid $R_a$—OH that introduces the group $R_a$ and corresponds to an acyl group selected, for example, from the group consisting of —C(=O)—H, —C(=O)—$C_1$-$C_9$ alkyl, —C(=O)—$C_2$-$C_{19}$ alkenyl, —C(=O)—$C_2$-$C_4$ alkenyl-$C_6$-$C_{10}$ aryl, —C(=O)—$C_6$-$C_{10}$ aryl, —C(=O)—O—$C_1$-$C_6$ alkyl, —C(=O)—O—$C_6$-$C_{10}$ aryl, —C(=O)—NH—$C_1$-$C_6$ alkyl, —C(=O)—NH—$C_6$-$C_{10}$ aryl and —C(=O)—N($C_1$-$C_6$ alkyl)$_2$, or a reactive functional derivative thereof, e.g. the acid halide Ra—X, e.g. the acid chloride, or anhydride, e.g. ($R_a$)$_2$O. The hydroxylamine esters (I) and methods for their preparation are described in WO 01/90113.

A preferred hydroxylamine ester (I) is selected from the group consisting of sterically hindered amine derivatives of the formula:

wherein $R_1$' and $R_2$' independently of one another represent hydrogen or methyl;
$R_a$ represents $C_1$-$C_8$ alkanoyl; and
$R_a$' represents $C_8$-$C_{22}$ alkanoyl.

According to a more preferred embodiment the hydroxylamine ester (I) is selected from the group consisting of sterically hindered amine derivatives of the formula:

Most preferred is a compound of the above formula, in which the alkylgroup is a $C_{17}$-group. Such a compound is commercially available under the tradename Irgatec® CR76.

The hydroxylamine ester can also be added in the form of a masterbatch containing these compounds in a polymer matrix in a concentration of, for example, from about 1 to 50% by weight, preferably from 2 to 10% by weight.

Ad Synergistic Visbreaking Agent Composition

The synergistic visbreaking agent composition of the present invention contains peroxide (i) and a hydroxylamine ester (ii) in a range of from 1 wt % (i):99 wt % (ii) to 99 wt % (i): 1 wt % (ii), preferably in the range of 20 wt % (i):80 wt % (ii) to 95 wt % (i):5 wt % (ii), more preferably in the range of 25 wt % (i):75 wt % (ii) to 90 wt % (i):10 wt % (ii), even more preferably in the range of 30 wt % (i):70 wt % (ii) to 85 wt % (i):15 wt % (ii) and most preferably in the range of 50 wt % (i):50 wt % (ii) to 85 wt % (i):15 wt % (ii).

The weight percentages are related to the pure compounds (i) and (ii).

The peroxide and the hydroxylamine ester can be used directly as mixture or the two components of the composition can be added separately to the to be visbroken polypropylene polymer.

Preferably the peroxide and the hydroxylamine ester are added to the to be visbroken polypropylene polymer directly as a mixture.

Preferably the hydroxylamine ester is added in the form of a masterbatch and the peroxide in pure form.

More preferably the peroxide as well as the hydroxylamine ester is added in the form of a masterbatch.

Ad Polypropylene Polymer to be Visbroken

The polypropylene polymers to be visbroken can encompass propylene homopolymers, propylene random copolymers and polypropylene blends.

Propylene random copolymers comprise one or two comonomers in various proportions up to 20 wt %, preferably up to 10 wt %, of total content of comonomers. Examples of comonomers are: olefins such as 1-olefins, e.g. ethylene, 1-butene, 1-pentene, 1-hexene, 1-heptene or 1-octene, isobutylene, cycloolefins, e.g. cyclopentene, cyclohexene, norbornene or ethylidenenorbome, dienes such as butadiene, isoprene, 1,4-hexadiene, cyclopentadiene, dicyclopentadiene or norbornadiene; also acrylic acid derivatives and unsaturated carboxylic anhydrides such as maleic anhydride.

Preferred comonomers are ethylene, 1-butene, 1-hexene and 1-octene.

Polypropylene blends which can be used are mixtures of polypropylene with polyolefins, preferably with polypropylene based polymers.

Preferably propylene homopolymers or propylene random copolymers are used as starting material, more preferably only propylene homopolymers are used.

The addition to the polypropylene, propylene copolymers or polypropylene blend can be carried out in all customary mixing machines in which the polymer is melted and mixed with the additives. Suitable machines are known to those skilled in the art. They are predominantly mixers, kneaders and extruders.

The process is preferably carried out in an extruder by introducing the synergistic visbreaking agent composition during processing.

Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in Handbuch der Kunststoffextrusion, Vol. 1 Grundlagen, Editors F. Hensen, W Knappe, H. Potente, 1989, pp. 3-7, ISBN:3-446-14339-4 (Vol. 2 Extrusionsanlagen 1986, ISBN 3-446-14329-7).

The above-described compositions comprising peroxide (i) and hydroxylamine ester (ii) are added to the to be visbroken propylene polymer in concentrations, based on the amount of polymer to be visbroken, of from about 0.001 to 5.0% by weight, in particular from 0.01 to 2.0% by weight and particularly preferably from 0.02 to 1.0% by weight. As mentioned above, the peroxide (i) and the hydroxylamine ester ii) can be added as individual compounds or as mixtures to the polymer to be visbroken.

In addition to the synergistic visbreaking agent composition selected antioxidants, acid scavengers and/or processing stabilizers or mixtures of these may be added to the to be visbroken propylene polymer in small amounts of up to 3.0 wt %, preferably up to 1.5 wt %, more preferably up to 1.0 wt % based on the polypropylene polymer at the most. For additive, typical we add max. 1 wt % to total Examples of suitable antioxidants are:

Pentaerythrityl tetrakis(3-(3,5-di-tert-butyl-4-hydroxyphenyl)propionate) (Irganox® 1010), octadecyl-3-(3,5-di-tertbutyl-4-hydroxyphenyl)propionate) (IRGANOX 1076), 3,3',3',5,5',5'-hexa-tert-butyl-α,α',α'-(mesitylene-2,4,6-triyl) tri-p-cresol (IRGANOX 1330), calcium diethyl bis(((3,5-bis (1,1-dimethylethyl)-4-hydroxyphenyl)methyl)phosphonate) (IRGANOX 1425), 1,3,5-tris(3,5-di-tert-butyl-4-hydroxybenzyl)-1,3,5-triazine-2,4,6(1H,3H,5H)trione (IRGANOX 3114), tris(2,4-di-tert-butylphenyl) phosphite (Irgafos® 168), tris(nonylphenyl) phosphite, tetrakis(2,4-di-tert-butylphenyl) [1,1-biphenyl]-4,4'-diylbisphosphonite (IRGANOX P-EPQ), didodecyl 3,3'-thiodipropionate (IRGANOX PS 800), dioctadecyl 3,3'-thiodipropionate (IRGANOX PS 802); 5,7-di-tert-butyl-3-(3,4-dimethylphenyl)-3H-benzofuran-2-one (IRGANOX HP 136) and distearylhydroxylamine (Irgastab® FS 042).

Suitable acid scavengers are for example calcium stearate, zinc stearate, hydrotalcites or calcium lactate or calcium lactylate from Patco (Pationic®)

The polypropylene polymers are visbroken at elevated temperatures, but still below a melt extrusion temperatures of below 250° C., preferably at a melt extrusion temperature from 160° C. to below 250° C. and more preferably from 200° C. to 245° C.

The period of time necessary for degradation can vary as a function of the temperature, the amount of material to be degraded and the type of, for example, extruder used.

The synergistic visbreaking agent composition increases the visbreaking efficiency compared to the use of the individual components as is shown in the experimental part. It is shown that the molecular weight reduction effect is higher than expected, indicating a synergism between the two radical generating agents.

Therefore by using the synergistic visbreaking agent composition it is possible to use smaller amounts of visbreaking agents in order to achieve the desired result.

Thus a further aspect of the present invention is the use of such a composition comprising a peroxide (i) and a hydroxylamine ester (ii) for increasing the melt flow rate $MFR_2$ (230° C./2.16 kg) measured according to ISO 1133 of polypropylene polymers at melt extrusion temperatures below 250° C.

In another aspect the present invention is related to a method for increasing the visbreaking efficiency for polypropylene polymers at melt extrusion temperatures below 250° C. by adding the synergistic visbreaking composition of peroxide (i) and a hydroxylamine ester (ii) to the polypropylene polymer to be visbroken.

In a further aspect the present invention is related to the use of polypropylene polymers being visbroken with the synergistic visbreaking composition for producing melt blown non-wovens with improved barrier properties.

The melt blown non-wovens produced from a polypropylene polymer being visbroken with the synergistic visbreaking composition shows increased barrier properties compared to polypropylene polymers being visbroken either by the use of peroxide or by the use of hydroxylamine ester alone.

The increased barrier properties are shown by a higher hydrohead value (3rd drop, cm H2O resp. mbar), measured according to standard test WSP 80.6 (09).

Further, the present invention is also directed to an article selected from the group consisting of filtration media (filter), diapers, sanitary napkins, panty liners, incontinence products for adults, protective clothing, surgical drapes, surgical gown, and surgical wear in general, comprising the melt-blown non-wovens, preferably in an amount of at least 80.0 wt %, more preferably in an amount of at least 95.0 wt %, based on the total weight of the article. In one embodiment of the present invention, the article consists of the melt-blown non-woven.

EXPERIMENTAL PART

A. Measuring Methods

The following definitions of terms and determination methods apply for the above general description of the invention including the claims as well as to the below examples unless otherwise defined.

Calculation of Total Expected $MFR_2$

Under the proviso that the total MFR of the composition visbroken with peroxide and hydroxylamine follows the additive law, the total MFR will be the sum of the MFR (peroxide)+MFR (hydroxylamine).

Meaning that the calculated MFR is the sum of MFR of material visbroken only with peroxide and the MFR of material visbroken only with hydroxylamine ester, which have been measured (see also FIG. 1)

$MFR_2$ (230° C.) is measured according to ISO 1133 (230° C., 2.16 kg load). The $MFR_2$ of the polypropylene composition is determined on the granules of the material, while the $MFR_2$ of the melt-blown web is determined on cut pieces of a compression-molded plaque prepared from the web in a heated press at a temperature of not more than 200° C., said pieces having a dimension which is comparable to the granule dimension.

Hydrohead

The hydrohead or water resistance as determined by a hydrostatic pressure test is determined according to the WSP (worldwide strategic partners) standard test WSP 80.6 (09) as published in December 2009. This industry standard is in turn based on ISO 811:1981 and uses specimens of 100 cm² at 23° C. with purified water as test liquid and a rate of increase of the water pressure of 10 cm/min. An $H_2O$ column height of X cm in this test corresponds to a pressure difference of X mbar.

Filtration Efficiency

Air filtration efficiency was determined based on EN 1822-3 for flat sheet filter media, using a test filter area of 400 cm². The particle retention was tested with a usual aerosol of di-ethyl-hexyl-sebacate (DEHS), calculating efficiency for the fraction with 0.4 μm diameter from a class analysis with 0.1 μm scale. An airflow of 16 $m^3 \cdot h^{-1}$ was used, corresponding to an airspeed of 0.11 $m \cdot s^{-1}$.

B. Examples

Materials Used

PP-Homo-1: HC001A-B1: propylene homopolymer with a density of 905 kg/m³ and an MFR (2.16 kg, 230° C.) of 3.7 g/10 min. It is distributed by Borealis.

PP-Homo-2: HJ120UB: propylene homopolymer Borealis with an $MFR_2$ (2.16 kg, 230° C.) of 75 g/10 mM, and a density of 0.905 g/cm PP-Homo-3: HD120MO: propylene homopolymer of Borealis with an $MFR_2$ (2.16 kg, 230° C.) of 9 g/10 min and a density of 0.905 g/cm Antioxidant (AO): Irganox 1010 (FF) provided by BASF Acid Scavenger (AS): Calcium stearate provided by Faci.

Pure POX: peroxide pure: 2,5-dimethyl-2,5-bis(tert.butyl-peroxy)hexane (DHBP) (CAS No. 78-63-7; sold under trade nameTrigonox 101 from AkzoNobel, NL)

Peroxide (POX PP5% ig): Masterbatch 5% in PP. DHBP-5-ICS produced by United Initiators.

(5% 2,5-Dimethyl-2,5-di(tert-butylperoxy)hexane (DHBP) in 95% PP) Hydroxylamine ester: Irgatec® CR 76, Masterbatch 3.3 wt % in PP, provided by BASF (Irgatec® MB)

Thio-Compound 1: 1-Octadecanethiol, CAS NO. 2885-00-9, assay 98% was purchased from Sigma Aldrich and used as it is.

Example IE1 to 1E3+CE1 to CE5

X wt % PP-Homo-1 were mixed with 0.1 wt % Irganox 1010 (FF), 0.05 wt % Calcium stearate (CAS No. 1592-23-O) y wt % Peroxide Masterbatch and z wt % Irgatec® CR 76 Masterbatch by using extruder ZSK 18 at 240° C., with a throughput of 7 kg/h.

The wt % amounts can be seen in Table 1. Furthermore the $MFR_2$ (2.16 kg, 230° C.) values are given in Table 1.

TABLE 1

| | Example | | | | | | | |
|---|---|---|---|---|---|---|---|---|
| Component | CE1 [wt %] | CE2 [wt %] | CE3 [wt %] | IE1 [wt %] | IE2 [wt %] | IE3 [wt %] | CE4 [wt %] | CE5 [wt %] |
| PP-homo-1 | 99.85 | 98.25 | 99.05 | 98.25 | 98.25 | 98.25 | 99.05 | 98.25 |
| AO | 0.1 | 0.1 | 0.1 | 0.1 | 0.1 | 0.1 | 0.1 | 0.1 |
| AS | 0.05 | 0.05 | 0.05 | 0.05 | 0.05 | 0.05 | 0.05 | 0.05 |
| POX PP5% ig | 0 | 1.6 | 0.8 | 0.4 | 0.8 | 1.2 | 0 | 0 |
| Irgatec ® MB | 0 | 0 | 0 | 1.2 | 0.8 | 0.4 | 0.8 | 1.6 |
| $MFR_2$ | 3.76 | 35.3 | 16.17 | 34.16 | 36.19 | 37.14 | 9.1 | 18.4 |

IE . . . Inventive Example

CE . . . Comparative Example

Table 2 shows the calculated MFR$_2$ (2.16 kg, 230° C.) that has been expected compared to the real MFR$_2$ (2.16 kg, 230° C.)

TABLE 2

| Irgatec ® MB [wt %] | MFR Calc. | POX PP5% ig [wt %] | MFR Calc. | Additive raw | MFR real | 1.6 [wt %] – POX [wt %] |
|---|---|---|---|---|---|---|
| 0.4 | 6.7 | 1.2 | 26.3 | 33.0 | 37.14 | 0.4 |
| 0.8 | 10.4 | 0.8 | 18.4 | 28.8 | 36.16 | 0.8 |
| 1.2 | 14.1 | 0.4 | 10.5 | 24.6 | 34.16 | 1.2 |
| 1.6 | 18.4 | 1.6 | 35.3 |  |  | 0 |

FIG. 1 shows the MFR$_2$ values for the addition of only POX PP5% ig or only Irgatec® MB FIG. 2 shows the calculated MFR$_2$ values vs. the real MFR$_2$ values for 1.6 wt % of total visbreaking agent minus the wt % of POX (peroxide) used.

Example IE4 and CE6 and CE 7

PP-homo-2 was mixed with 0.1 wt % Irganox 1010 (FF) and 0.05 wt % Calcium stearate (CAS No. 1592-23-0).

Then PP-homo-2 has been visbroken by using a co-rotating twin-screw extruder at 240° C. and using 1700 ppm pure POX (Trigonox 101) to achieve the target MFR$_2$ of 800 g/10 min for CE6.

For CE7 1.5 wt % of Irgatec® CR76 MB was used to achieve the target MFR$_2$ of 800 g/10 min.

For IE4 1.1 wt % of Irgatec® CR76 MB and 300 ppm pure POX (Trigonox 101) was used to achieve the target MFR$_2$ of 800 g/10 min.

The polypropylene compositions of IE4, CE6 and CE7 have been converted into melt-blown non-woven webs on a Reicofil MB250 line using a spinneret having 470 holes of 0.4 mm exit diameter and 35 holes per inch. Webs were produced at different melt temperatures, throughputs, DCD (die to collector distance) and air volumes.

The processing conditions for and properties of the melt-blown webs are indicated in tables 3 and 4

TABLE 3

Processing conditions for the production of the melt-blown webs

| Example | Melt Temperature ° C. | DCD mm | Air volume m³/h | Throughput kg/h · m | Web weight g/m² | MFR web g/10 min |
|---|---|---|---|---|---|---|
| IE4 | 270 | 200 | 270 | 10 | 9.5 | 1041 |
| CE6 | 270 | 200 | 310 | 10 | 10 | 1000 |
| CE7 | 270 | 200 | 200 | 10 | 9.5 | 976 |

TABLE 4

Properties of the melt-blown webs

| Example | Filtration Efficiency % | Quality factor 100/Pa | Hydrohead (3$^{rd}$ drop) cm H$_2$O* |
|---|---|---|---|
| IE4 | 36.7 | 0.597 | 106.6 |
| CE6 | 25.18 | 0.561 | 81.5 |
| CE7 | 30.52 | 0.627 | 88.4 |

As can be seen from Table 4 and from FIG. 3 the use of polypropylene polymer, which has been visbroken with the inventive synergistic visbreaking agent composition for producing melt blown non-woven webs gives webs having higher hydrohead values compared to the comparative examples.

Comparative Example 8

For this Comparative Example PP-homo-3 has been visbroken by Irgatec® MB and/or by Thio-1 by using extruder ZSK 18 at 250° C., with a throughput of 7 kg/h.—results see Table 5

TABLE 5

|  | No visbreaking | Irgatec ® MB [wt %] | Thio-1 [wt %] | Irgatec ® MB + Thio-1 [wt %] |
|---|---|---|---|---|
| PP-homo-3 | 100 wt % | 99.725 | 99.775 | 99.698 |
| Irgatec ® MB | 0 | 0.08 | 0 | 0.08 |
| Thio-1 | 0 | 0 | 0.025 | 0.025 |
| MFR$_2$ | 8 | 10.5 | 15.3 | 14.1 |

As can be seen from FIG. 4 there is absolutely no synergistic effect by using Irgatec® in combination with Thio-1 in view of visbreaking efficiency.

The invention claimed is:

1. A method of forming melt blown non-wovens with improved barrier properties comprising
   a) providing a polypropylene homo- or copolymer,
   b) visbreaking said polypropylene homo- or copolymer by melt extrusion, whereby the melt extrusion temperature is from 200° C. to 245° C. in the presence of a synergistic visbreaking composition comprising peroxide (i) selected from the group consisting of 2,5-dimethyl-2,5-bis(tert-butyl-peroxy)hexane, 2,5-dimethyl-2,5-bis(tert-butyl-peroxy)hexyne-3, dicumyl peroxide, di-tert-butyl-peroxide, tert-butyl-cumyl-peroxide, and bis (tert-butylperoxy-isopropyl)benzene; and hydroxylamine ester (ii) selected from the group consisting of sterically hindered amine derivatives of the formula:

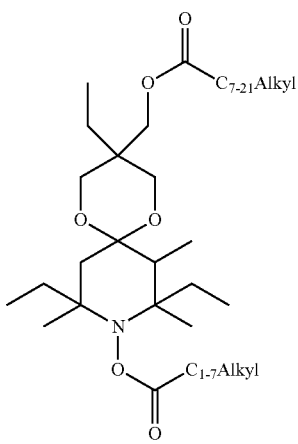

whereby the amounts of peroxide (i) and hydroxylamine ester (ii) are in the range of from 50 wt % (i):50 wt % (ii) to 85 wt % (i):15 wt % (ii) thereby providing a visbroken polypropylene homo- or copolymer; and c) producing melt blown non-wovens from said visbroken polypropylene homo- or copolymer.

2. The method of claim 1, in the absence of sulfur containing compounds.

3. The method of claim 1, whereby peroxide (i) and/or hydroxylamine ester (ii) are used as a masterbatch/masterbatches.

4. The method of claim 1, whereby peroxide (i) and/or hydroxylamine ester (ii) are added as mixture to the polypropylene homo- or copolymers to be visbroken.

5. The method of claim 1, whereby peroxide (i) and/or hydroxylamine ester (ii) are added separately to the polypropylene homo- or copolymers to be visbroken.

* * * * *